United States Patent [19]

Sumner et al.

[11] 4,138,090
[45] Feb. 6, 1979

[54] BUTTERFLY VALVE WITH TWO-WAY PRESSURE ENHANCED SEALING

[76] Inventors: Joe D. Sumner, 6903 Alderney Dr., Houston, Tex. 77055; Carlton H. Stanley, 2002 Cobble Creek Dr., Houston, Tex. 77090

[21] Appl. No.: 774,642

[22] Filed: Mar. 4, 1977

[51] Int. Cl.² .............................................. F16K 51/00
[52] U.S. Cl. .................................... 251/152; 251/173; 251/306
[58] Field of Search ............... 251/152, 171, 173, 307, 251/308, 306

[56] References Cited

U.S. PATENT DOCUMENTS

| | | | |
|---|---|---|---|
| 1,834,870 | 12/1931 | Bogers | 251/173 |
| 1,990,309 | 2/1935 | Phillips | 251/173 X |
| 2,488,380 | 11/1949 | Danks | 251/173 |
| 2,673,708 | 3/1954 | Danks | 251/173 |
| 2,911,184 | 11/1959 | Moore | 251/173 |
| 2,939,674 | 6/1960 | Anderson | 251/173 |
| 2,965,354 | 12/1960 | Grove | 251/173 |
| 3,095,177 | 6/1963 | Muller | 251/173 |
| 3,722,856 | 3/1973 | Koch | 251/152 |

*Primary Examiner*—Harold W. Weakley
*Attorney, Agent, or Firm*—James L. Jackson

[57] ABSTRACT

A high-pressure butterfly valve having pressure enhanced sealing which comprises a valve body defined by a pair of interfitting body plates that are retained in assembly by bolts that also secure the valve mechanism into a flow line. The interfitting valve plates also cooperate to define a seal recess within which is received annular sealing means that provide a peripheral seal about a butterfly disc that is rotatably supported within a flow passage defined by the valve body plates. The annular sealing means also includes a pressure-responsive portion that is energized by pressure upstream of the butterfly element and which is directly responsive to pressure to urge the sealing portion thereof into sealing engagement with the periphery of the butterfly element. The valve body is so constructed that the downstream plate thereof may be secured in assembly with the upstream plate by bolts extending through an upstream pipe flange, thereby allowing the valve mechanism to be employed in the absence of any abutting relationship with a downstream pipe flange. The pressure enhancing feature of the annular sealing means also induces pressure enhanced sealing about a valve stem and trunnion that support the butterfly element for rotation within the flow passage of the valve and pressure enhanced sealing of the joint between the body plates. The two-way sealing ability of the valve is accomplished by communicating fluid pressure from the upstream line through a passage system in the disc and trunnion that communicates the upstream pressure to an annular seal chamber.

35 Claims, 10 Drawing Figures

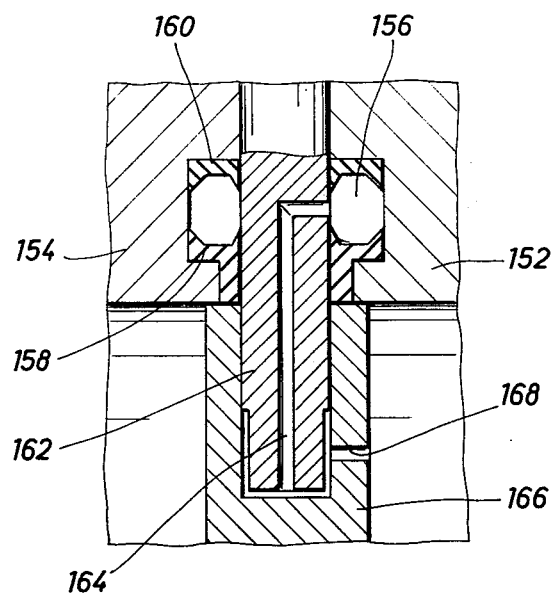
FIG. 8
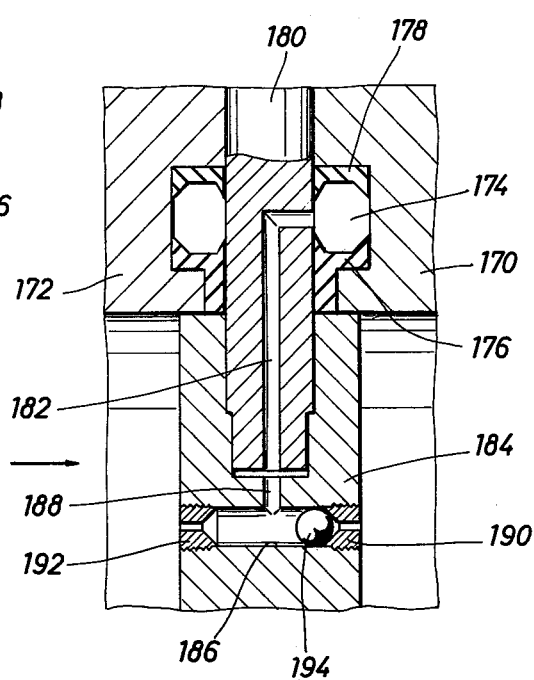
FIG. 9
FIG. 10
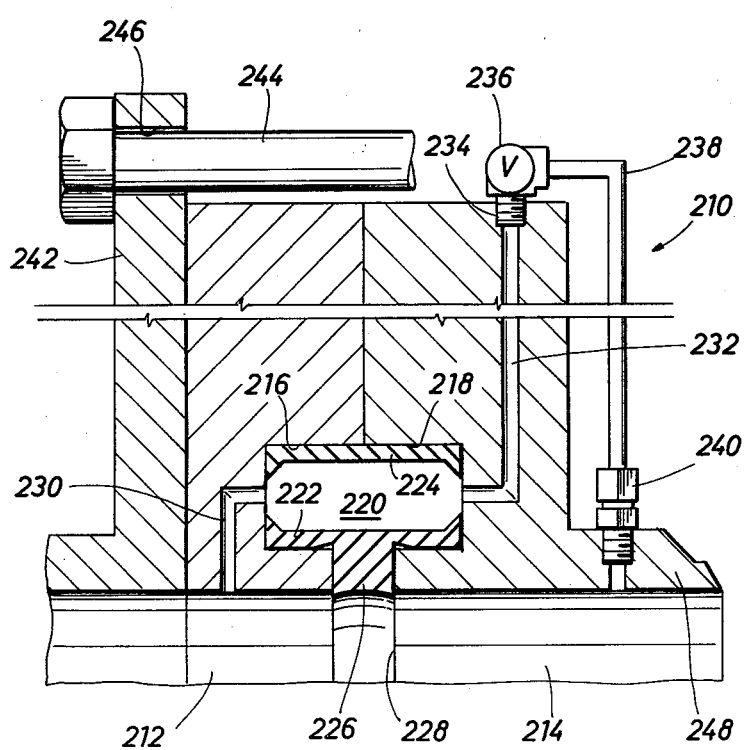

BUTTERFLY VALVE WITH TWO-WAY PRESSURE ENHANCED SEALING

FIELD OF THE INVENTION

This invention relates generally to the control of a flowing fluid medium by a valve element and more specifically relates to a butterfly valve mechanism having a valve disc or butterfly that may be rotated between open and closed positions within a flow passage. Even more specifically, this invention relates to a pressure enhanced butterfly valve mechanism wherein an annular sealing element is disposed about the periphery of a butterfly valve element of the valve mechanism and is enhanced by the pressure of the fluid medium controlled thereby so as to cause the sealing ability of the valve to increase in direct response to increases in pressure of the fluid medium that is controlled by the valve. This invention also relates generally to butterfly valve mechanisms that are capable of being employed at the downstream extremity of a flanged pipe section to provide a closure for such downstream pipe section.

BACKGROUND OF THE INVENTION

Butterfly valves have historically been classified as low pressure valves that are typically utilized when the fluid pressure conditions to be encountered are of nominal nature. It is well known to be quite difficult to provide a butterfly valve mechanism having an annular sealing element that is capable of providing a positive seal about the periphery of a butterfly valve element in the closed position thereof, with positive sealing in both low and high pressure conditions. Butterfly valves have therefore been typically utilized in the past under conditions where a nominal amount of leakage is acceptable. Although butterfly valve leakage typically occurs because of internal sealing inadequacy, the trunnion sealing elements of many butterfly valve mechanisms also fail to provide an adequate seal and thereby cause a significant leakage problem.

Split valve bodies are incorporated into many different types of mechanisms, but in the case of butterfly valves, although split bodies are utilized to some degree, it is difficult to provide an efficiently designed split body assembly. Since the butterfly element must be supported by stem and trunnion openings of the valve body these openings will typically create stem and trunnion leakage problems that are difficult to overcome. It is therefore typical in the industry to provide integral valve body structures or, in the alternative, to provide valve body joints on a bias so that the stem and trunnion openings are not intersected. This of course adds materially to the cost of machining the butterfly valve body and therefore materially affects the market price of valves so manufactured.

THE PRIOR ART

Split valve body arrangements are exemplified by U.S. Pat. Nos. 3,080,145 of Swain, 3,752,181 of Morris, et al, Re 23,613 of Danks and 3,290,001 of Taylor. Valves including pressure enhanced sealing are identified by U.S. Pat. Nos. 1,844,641 of Dewein, 3,208,718 to White and 3,095,177 of Muller. Butterfly valves with pressure enhanced sealing are exemplified by U.S. Pat. Nos. 1,834,988 of White, 3,250,510 of Williams, 3,550,906 of Mayers, 2,488,380 of Danks and 3,986,699 of Wucik et al. Butterfly valves having bias oriented stems and trunnions are shown by U.S. Pat. No. 2,911,184 of Moore and Swain, No. 3,080,145. Pressure enhanced sealing is also disclosed by U.S. Pat. No. 3,216,695 of Bartholet. Single flange mounting capability is taught by U.S. Pat. No. 3,722,856 of Koch.

For purposes of overcoming the foregoing problems typically associated with butterfly valves, it is a primary object of the present invention to provide a novel, high-pressure butterfly valve construction utilizing a split body design with the valve body being split in such manner as to define a joint that extends through the stem and trunnion of the valve structure.

It is also an object of the present invention to provide a novel butterfly valve construction employing a split body structure that is adapted to be interposed between a pair of pipe flanges and to be held in assembly by bolts extending through the pipe flanges and the valve body.

It is also a feature of the present invention to provide a novel butterfly valve construction employing a split valve body construction wherein the split valve body may be secured in assembly with a single downstream pipe flange by threaded bolts, thereby providing a valved closure at the downstream extremity of the pipe section.

Among the several features of the present invention is noted the contemplation of a novel butterfly valve construction incorporating annular sealing means that engages the periphery of a rotatable butterfly valve element in the closed position thereof to provide a pressure enhanced seal that is responsive to line pressure to enhance the sealing ability of the valve.

It is also an important feature of the present invention to provide a novel butterfly valve construction incorporating sealing means that seals about the periphery of a butterfly valve element in the closed position thereof and which includes a major portion thereof retained within an annular valve body groove that is so constructed as to prevent material extrusion of the sealing element into the flow passage of the valve.

It is an even further feature of the present invention to provide a novel high pressure butterfly valve construction incorporating annular sealing means which includes pressure enhanced stem and trunnion sealing portions that are enhanced by line pressure to prevent leakage along the stem and trunnion.

Another important feature of the present invention contemplates the provision of a novel pressure enhanced butterfly valve construction incorporating sealing means including a first annular sealing portion that provides sealing contact with the periphery of a rotatable butterfly valve element in the closed position of the valve and a second annular sealing portion which also provides a seal for the joint of a split valve body of the valve construction.

Also contemplated among the several features and advantages is a novel butterfly valve construction that is capable of two-way sealing, allowing reversal of flow in the flow line controlled by the valve.

Another important feature of the present invention is the provision of a novel butterfly valve having seal activating pressure relief capability to facilitate ease of operation under high pressure conditions.

It is also a feature of the present invention to provide a novel pressure enhanced butterfly valve construction that is of simple design, is low in cost and reliable in use.

Other and further features, advantages and objects of the present invention will become apparent to one skilled in the art upon full consideration of the present disclosure. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may conveniently take the form of a two-piece split valve body that is adapted to be interposed between the flanges of a pair of flanged pipe sections and which is maintained in position by bolts that extend both through the flanges and through mating bolt apertures formed in the valve body construction. The split valve body is defined by a pair of body plates that are of generally circular disc-like configuration and are formed to define semi-cylindrical stem and trunnion receptacles cooperatively defining stem and trunnion passages when the body sections are placed in assembly. The annular disc-like body plates are also machined to define annular grooves that interfit to define an annular seal chamber within which may be received an inner annular sealing element, defining a portion of the sealing means, to establish sealing about the periphery of a butterfly valve disc in the closed position thereof. An annular sealing portion of the inner sealing element extends through an internal groove defined by the valve body construction for engagement with the peripheral sealing surface of the valve disc. The configuration of the groove and the inner sealing element is such that a major base portion of the sealing element is retained within an enlarged seal chamber and is prevented by annular shoulders from being extruded into the flow passage by the pressure of the fluid controlled by the valve. Opposed tapered flanges of the inner sealing element are slightly deformed on assembly of the valve body plates, developing an interference fit that establishes low pressure sealing ability of the valve. At least one of the valve body plates is formed to define pressure-introducing passages that conduct upstream line pressure through the valve body construction into the annular seal chamber, thereby allowing line pressure to act upon the sealing element in such manner as to urge the sealing portion thereof into sealing engagement with the periphery of the valve disc. As pressure increases, the sealing ability of the sealing element is enhanced in direct proportion thereto. An outer annular sealing element, also defining a portion of the sealing means, cooperates with each of the valve body plates to define seals therewith and prevent any leakage in the joint established between the assembled valve body plates. Low pressure sealing of the outer annular sealing element is developed by slight mechanical deformation of opposed annular tapered flanges of the outer sealing element upon assembly of the body plates, defining an interference fit.

The outer annular sealing element of the valve mechanism is also formed to define annular tapered stem and trunnion sealing flange portions that are also acted upon by line pressure that is introduced into the annular seal chamber. Line pressure, acting upon the stem and trunnion sealing portions, enhances the sealing ability of the stem and trunnion sealing portions in direct response to the magnitude of line pressure.

The downstream one of the body plates may be formed to define threaded openings through which the bolts extend that retain the valve body in assembly between the flanges of the pipe. In the event it is desired to utilize the valve as a downstream closure for a flanged pipe section, threaded bolts may be extended through the apertures of the upstream valve body plate and may be threaded into the downstream valve body plate to serve to retain both of the plates in assembly with the single pipe flange. In this manner, the butterfly valve mechanism serves efficiently to provide a closure at the downstream extremity of a pipe section.

Two way sealing may be effectively accomplished by pressurization of the seal chamber through passage means extending through passage means extending through the valve stem and valve disc and terminating on one side of the disc. The direction of fluid flow through the valve may be reversed if desired as long as the passage of the disc is positioned in communication with the upstream line. This can be effectively accomplished through use of a ball check valve in the butterfly disc to seal the downstream side of a transverse passage through the disc that is also in communication through a stem passage with the seal chamber of the valve.

Under extremely high pressure conditions, ease of valve movement from the closed position toward an open condition may be insured by providing a valve controlled bypass passage extending from the seal chamber to the downstream line.

BRIEF DESCRIPTION OF THE DRAWINGS

So that the manner in which the above recited features, advantages and objects of the present invention, as well as others which will become apparent, are attained and can be understood in detail, more particular description of the invention briefly summarized above may be had by reference to the embodiment thereof which is illustrated in the appended drawings, which drawings form a part of this specification.

It is to be noted, however, that the appended drawings illustrate only a typical embodiment of the invention and are therefore not to be considered limiting of its scope, for the invention may admit to other equally effective embodiments.

In the drawings:

Figure 1:
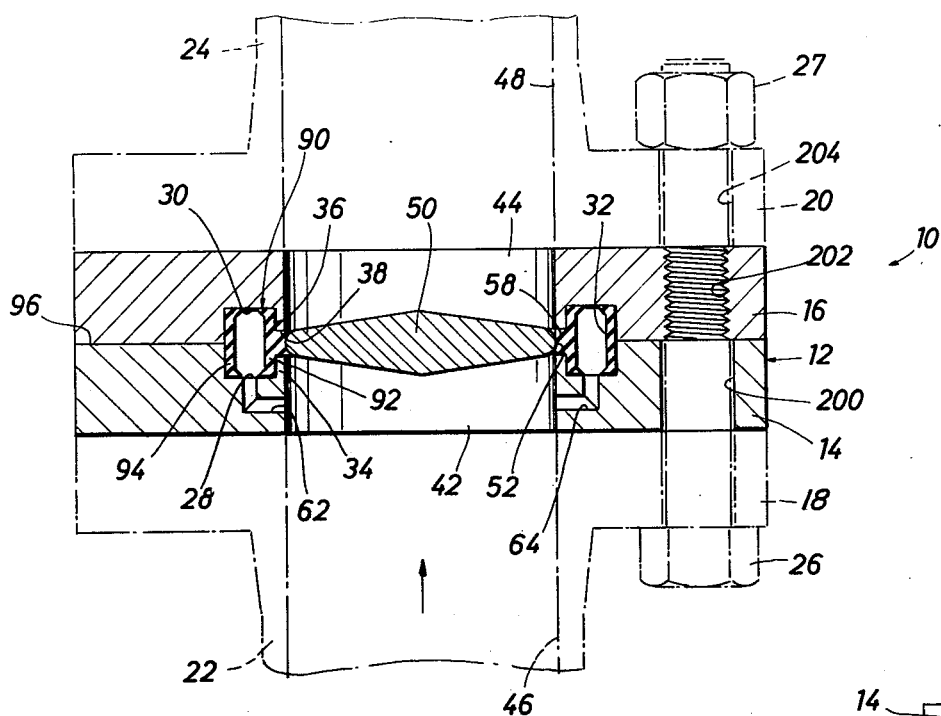
Figure 2:
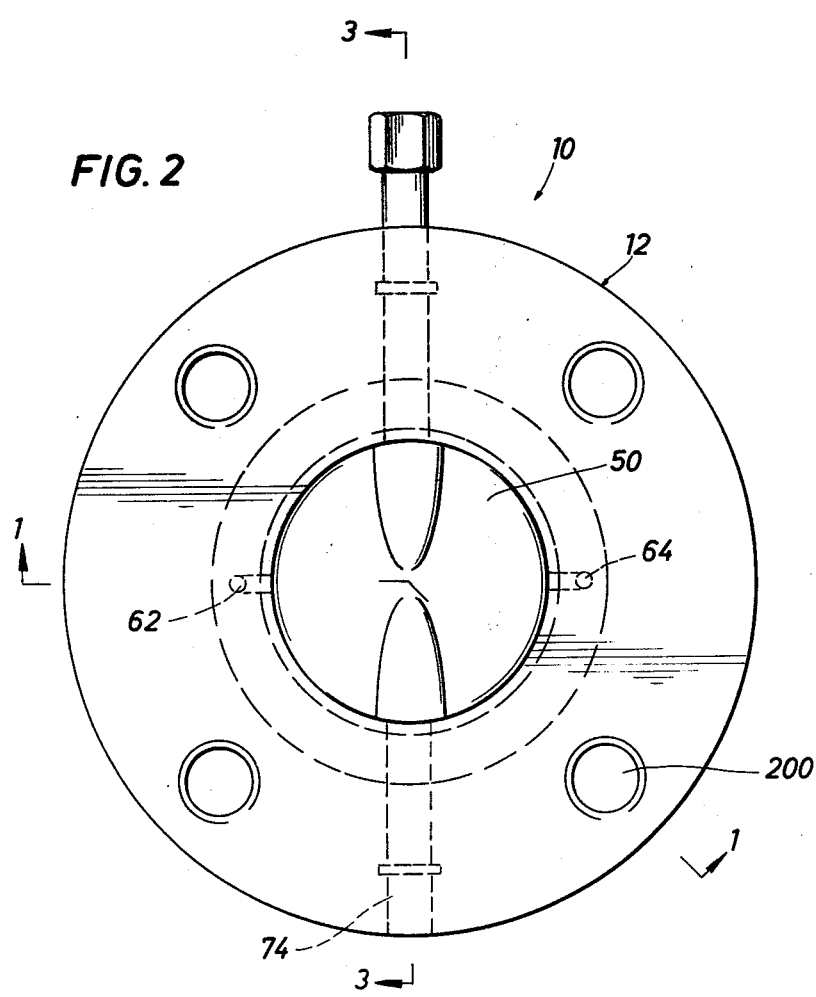

FIG. 1 is a sectional view taken along line 1—1 of the FIG. 2 of a butterfly valve mechanism constructed in accordance with the present invention and showing a pair of body plates that cooperate to retain an annular sealing element therebetween. The downstream valve body plate is also illustrated as defining internal threads that may receive the threads of a threaded bolt. Flanges are shown in broken line between which the valve mechanism may be positioned.

FIG. 2 is an elevational view of the valve body structure of FIG. 1 illustrating the bolt openings and the valve disc. The valve stem and trunnion are at least partially shown in broken line.

Figure 3:
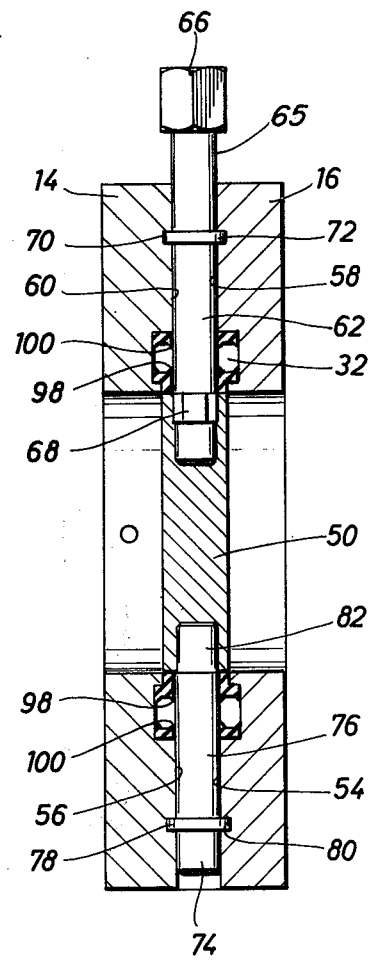

FIG. 3 is a sectional view taken along line 3—3 of FIG. 2 and illustrating the configuration of the stem and trunnion sealing portions of the sealing element in detail.

Figure 4:
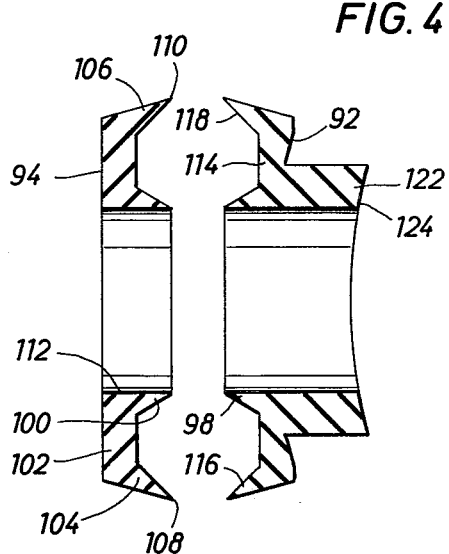

FIG. 4 is a partial sectional view illustrating both the inner and outer sealing elements, the section being taken through the stem and trunnion openings of the sealing elements.

Figure 5:
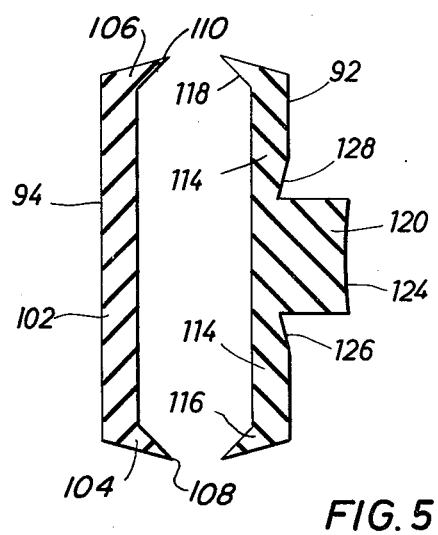

FIG. 5 is a partial sectional view illustrating the cross-sectional configuration of both the inner and outer sealing elements prior to assembly thereof within the seal chamber of the valve.

Figure 6:
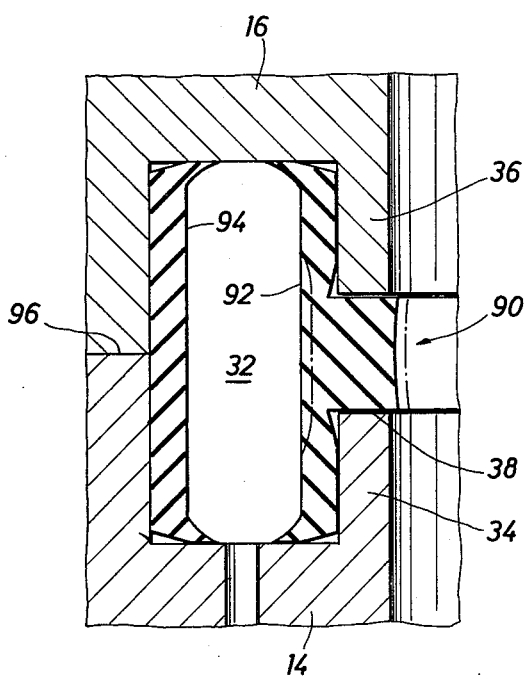

FIG. 6 is a fragmentary sectional view of the valve of the present invention, illustrating in detail the configuration of the seal chamber defined by the valve body plates and showing the relationship of the inner and outer sealing elements to the walls defining the seal chamber.

Figure 7:
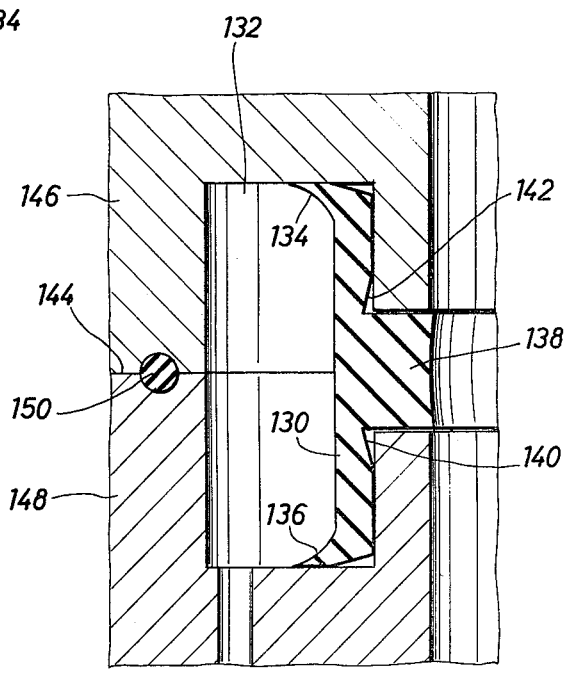

FIG. 7 is a fragmentary sectional view representing a modified embodiment of the present invention.

FIG. 8 is a fragmentary sectional view of a butterfly valve construction representing a modified embodiment of the present invention which is designed for two-way sealing allowing flow reversal through the valve.

FIG. 9 is a fragmentary sectional view of a two-way butterfly valve representing a further modified embodiment of the present invention.

FIG. 10 is a fragmentary sectional view of a butterfly valve mechanism constructed in accordance with the present invention and showing pressure relief of the annular seal chamber by means of a valve controlled bypass system.

DESCRIPTION OF PREFERRED EMBODIMENT

Referring now to the drawings and first to FIG. 1, there is shown a valve construction generally at 10 including a split valve body shown generally at 12 that incorporates upstream and downstream valve body plates 14 and 16, respectively. The valve body plates are adapted to be assembled as shown in FIG. 1 between flanges 18 and 20 of upstream and downstream pipe sections 22 and 24, respectively, shown in broken line. Bolts or threaded studs shown at 26 may be employed to retain the valve body plates in assembly and also to retain the valve mechanism between the flanges of the pipe sections.

It is desirable to provide a pressure-responsive butterfly valve mechanism having a sealing ability that is enhanced by line pressure. Such may be conveniently accomplished in the manner illustrated particularly in FIG. 1, where the upstream and downstream valve plates 14 and 16 are shown to be formed to define annular grooves 28 and 30 that cooperate to define an annular seal chamber 32. The seal chamber 32 is defined when the upstream and downstream valve plates are placed in assembly, such as shown in FIGS. 1 and 3. Opposed annular flanges 32 and 36 of the upstream and downstream valve body plates cooperate to define a restricted annular seal opening 38 through which a seal extends, said seal being described in detail hereinbelow. The valve body plates are each formed to define a centrally located aperture such as shown at 42 and 44, with such apertures being disposed in registry and defining a flow passage that is in turn positioned in registry with the bores 46 and 48 of the pipe sections.

Located within the flow passage of the valve is a valve plate or butterfly disc 50 having an annular peripheral sealing surface 52 that is positionable in registry with the annular seal opening 38. The valve disc 50 is rotatable from the closed position in FIG. 1, where it is positioned in substantially normal relation to the path of flow through the valve, to an open position where the disc is rotated substantially 90° from the position illustrated in FIG. 1, where it becomes substantially aligned with the path of fluid flow.

Referring now to FIGS. 2 and 3, the upstream and downstream valve body plates 14 and 16 are formed to define generally semi-cylindrical grooves such as shown at 54, 56, 58 and 60. At the upper portion of the valve body, as shown in FIG. 3, the semi-cylindrical stem grooves 58 and 60 cooperate to define a generally cylindrical stem passage 62 within which may be received a valve disc actuating stem 65. The actuating stem may be provided with a non-circular head portion 66 providing for connection of any suitable valve-actuating wrench, hand wheel or other actuating device to the free extremity of the valve stem. The inner portion of the valve actuating stem is also provided with a non-circular portion 68 that establishes a non-rotatable relationship with the valve disc 50. Rotation of the valve actuating stem 64 therefore induces rotation to the valve disc between the open and closed positions thereof. The stem passage defined by the interfitting upstream and downstream valve body plates is also formed to define an annular stem retainer groove 70 within which may be received a thrust shoulder 72 formed on the valve stem. Fluid pressure within the flow passage of the valve will act upon the cross-sectional dimension of the valve stem and will induce a force that urges the valve stem outwardly. This pressure induced force is transmitted from the valve stem through the thrust shoulder 72 to the valve body plates by virtue of the interconnected relationship between the thrust flange 72 and the annular groove 70. The annular groove 70 and thrust shoulder 72 also function cooperatively to prevent the body plates 14 and 16 from becoming misaligned. The annular thrust shoulders of the valve stem and trunnion function to establish a locking relationship with the body plates. With the thrust shoulders positioned within the respective retainer grooves, the stem and trunnion will positively orient the body plates and prevent them from becoming misaligned.

The valve disc is also supported at its lower portion by means of a trunnion element 74 that is received within a generally cylindrical trunnion passage 76 established by the generally semi-cylindrical grooves 54 and 56 that are defined in the upstream and downstream valve plates. A thrust shoulder 78 formed on the trunnion element 74 may be received within an annular groove 80 with the thrust flange 78 serving to transmit pressure induced forces from the trunnion to the valve body plate structure in the same manner as discussed above in connection with the valve stem 64. Both the valve stem and the trunnion are therefore blowout-proof by virtue of their thrust flange interconnection with the valve body defined by the valve plates. The valve disc 50 may have a rotatable relationship with the supporting portion 82 of the trunnion element 74 if desired.

Within the annular seal chamber or pocket may be located annular seal means, illustrated generally at 54, which includes a relatively large base portion 56 and a relatively small annular sealing portion 58. With the sealing element 54 in position within the annular seal chamber, the annular sealing portion 58 extends through the annular opening defined between the flanges 34 and 36 and is disposed for sealing contact with the peripheral sealing portion 52 of the butterfly disc 50. In the uncompressed or unpressurized state of the valve mechanism, the sealing portion 38 of the annular seal establishes light mechanical sealing contact with the peripheral sealing portion 52 of the disc in the closed position thereof, thereby providing an initial seal. This light mechanical seal allows the valve element to be quite freely rotated between the open and closed positions thereof. The annular seal chamber 32 is in communication with fluid pressure upstream of the butterfly valve element 50 by means of a plurality of pressure-communicating passages 62 and 64 that are defined in the upstream valve body plate 14. The pressurized fluid medium is introduced into the annular seal groove or chamber 32 by means of the passages 62 and 64 and induces pressure-responsive forces to bear upon the inner and outer sealing elements. This pressure responsive force urges the sealing portion 58 of the inner seal element 54 into tighter, more positive sealing engagement with the peripheral sealing portion 52 of the valve disc. In other words, the sealing portion 58 of the seal element is pressure enhanced or pressure responsive, and the sealing ability thereof is directly proportional to the magnitude of line pressure upstream of the closed butterfly valve element.

It is desirable to provide the butterfly valve construction of the present invention with means for establishing positive sealing engagement between the valve disc 50 and the valve body defined by assembled body plates 14 and 16. It is also desirable to provide a seal at the joint between the valve body plates 14 and 16 and to establish sealing engagement between the valve body structure and the actuating stem 62 and trunnion 76. In accordance with the present invention, means for accomplishing these desirable features may conveniently take the form illustrated generally in FIGS. 1 and 3 and shown in detail in FIG. 6. Within the annular seal chamber 32 may be located seal means generally at 90 that function to establish sealing between the valve body and the disc and also function to seal the joint between the valve body plates and establish sealing engagement with the stem and trunnion. Seal means 90 may include inner and outer sealing elements 92 and 94 respectively with inner sealing element 92 establishing sealing engagement with the valve body plates and with the outer peripheral sealing surface 52 of the valve disc 50. The outer annular sealing element 94 establishes sealing engagement with the valve body plate and prevents leakage at the joint 96 between body plates 14 and 16.

For the purpose of preventing leakage of line fluid along the valve stem and trunnion it is desirable to provide an efficient seal that functions throughout the pressure range of valve operation. Since the valve stem and trunnion are located in the valve body structure in such manner as to intersect the annular seal chamber or seal pocket, the inner and outer sealing elements 92 and 94 may be provided respectively with stem and trunnion seal portions 98 and 100 respectively which are shown particularly in FIG. 3 and in greater detail in FIG. 4. The stem and trunnion sealing portions of the inner and outer sealing elements define annular lips that are in engagement with the stem and trunnion. These lips are responsive to pressure within the annular groove or seal chamber 32 to cause sealing contact between the lips and stem and trunnion to be enhanced responsive to the magnitude of pressure acting within the seal chamber. The inner and outer sealing elements therefore provide a third pressure enhancing function by increasing the sealing ability of the stem and trunnion seals responsive to line pressure.

Referring now to FIGS. 4 and 5, the inner and outer sealing elements are depicted in greater detail and are shown in the unassembled condition thereof. The sectional view illustrated by FIG. 4 is taken in such manner as to illustrate the annular sealing lip 98 and 100 and to show the structure of the sealing elements at the stem and trunnion portions thereof. The sectional view illustrated by FIG. 5 illustrates the configuration of the inner and outer sealing elements 92 and 94 at a position other than through the stem and trunnion portions. The outer sealing element 94 may include an annular body portion 102 that engages the outer peripheral wall of the seal chamber 32 defined by registering annular grooves 28 and 30. The circular body portion 102 of the outer sealing element also bridges the joint 96 between the body plate 14 and 16 and serves to provide an effective seal at joint 96. The outer sealing element 94 may also be formed to define a pair of opposed annular sealing lips 104 and 106 that taper outwardly into circular knife edges 108 and 110. The sealing lips 104 and 106 extend outwardly beyond the width of the circular body portion 102 and are of greater width in the unassembled condition thereof than the width of the seal pocket 32. When the outer sealing element is assembled within the seal pocket 32 the circular base portion 102 will be retained easily within the seal pocket and the annular sealing lips 104 and 106 will be deformed inwardly, maintaining an interference sealing relationship with the wall structure of the seal pocket. This interference seal will readily develop the initial sealing ability of the outer sealing element and will cause it to be effective as a low pressure seal. Interference sealing will also be established by the circular sealing lip 100 because the opening 112 through which the stem or trunnion extends will be slightly smaller than the dimension of the stem or trunnion, causing an interference condition that develops low pressure sealing.

The inner sealing element 92 as shown in FIGS. 4 and 5 also includes an annular body portion 114 having annular sealing lips 116 and 118 formed thereby. The sealing lips 116 and 118 are of similar configuration and function as the lips 104 and 106 of the outer sealing element 102. Upon assembly within the sealing pocket 32 the sealing lips 116 and 118 will be deformed in such manner as to develop initial interference sealing that prevents leakage under low pressure conditions.

The inner sealing element is also provided with an annular integral sealing portion 120 that is located intermediate the extremities of the body portion 114. The annular sealing portion 120 is also integral with circular and stem and trunnion sealing portions 122 that function with the sealing portions 120 to establish positive sealing with the outer sealing periphery of the butterfly disc 50. Sealing portions 120 and 122 define a curved sealing surface 124 that establishes proper sealing engagement with the peripheral sealing surface of the butterfly disc.

It is desirable that the annular sealing portion 120 of the inner sealing element 92 have limited pressure responsive movement in order to establish adequate sealing at the various expected pressure conditions. This feature is effectively accomplished by providing annular relief portions 126 and 128 on either side of the annular sealing portion 120. The relief portions 126 and 128 provide seal standoff on either side of the annular seal opening 38 in the manner shown in FIG. 6. As pressure increases within the seal chamber 32, the annular sealing portion of the inner sealing element is allowed to deform regularly inwardly responsive to pressure as shown in broken lines in FIG. 6. This feature allows greater sealing contact area to be established between the sealing portion of the sealing element and the outer peripheral sealing surface of the butterfly disc.

Referring now to FIG. 7, a modified embodiment of the present invention is illustrated which utilizes an inner sealing element 130 that is essentially identical and has identical operating characteristics as compared to the sealing element 92 shown in FIGS. 4 and 5. Upon assembly within the sealing pocket 132, the outer sealing lip 134 and 136 of sealing element 130 will become deformed and will establish initial low pressure sealing. The annular sealing portion 138 of the sealing element is also capable of limited radial movement responsive to pressure conditions within the seal pocket 132 by virtue of the standoff developed by relieved portions 140 and 142 of sealing element 130. Sealing at the joint 144 between body plates 146 and 148 may be established by means of an annular sealing element 150 such as an O-ring that may be retained within an annular seal groove defined by the assembled body plates. In the event an O-ring or other suitable sealing element is utilized to establish a joint seal between the body plates 146 and 148 stem and trunnion sealing means must be provided. If desired, the sealing element 150 may incorporate circular stem and trunnion sealing portions as is well known in the art.

Referring now to FIGS. 8 and 9, there are depicted two alternative embodiments illustrating a valve construction capable of providing positive sealing regardless of the direction of flow. These valve contructions depict the two-way sealing capability of the valve mechanism of the present invention. In FIG. 8, which is a fragmentary sectional view of an alternative embodiment, valve body plates 152 and 154 are formed with annular grooves that cooperate in assembly to define an annular seal chamber 156. Inner and outer sealing elements 158 and 160 are provided that are essentially identical with the sealing elements illustrated in FIGS. 1-6. It is desirable to provide a butterfly valve mechanism having two-way sealing capability and this feature is effectively accomplished by providing a valve actuating stem 162 having a passage 164 formed therein that terminates within the seal chamber 156 and at the lower extremity of the valve stem. The valve disc 166 is formed to define a passage 168 that intersects the bore within which the valve stem 162 is retained. Due to the loose fitting relationship between the lower extremity of the valve stem and the valve stem bore, sufficient clearance occurs to communicate the pressurized medium from the passage 168 through the valve stem clearance to the passage 164 and thence into the seal chamber 156. Regardless of the direction of flow through the valve, the small passage 168 may be oriented such as to receive pressurized fluid from the upstream line. This pressure is conducted into the seal chamber 156 and utilized to enhance the pressure sealing capability of the valve in the manner discussed hereinabove.

The alternative embodiment illustrated in FIG. 9 accomplishes two-way sealing by providing valve body plates 170 and 172 having grooves machined therein that cooperate to define an annular seal chamber or pocket 174. Inner and outer sealing elements 176 and 178 received within the seal pocket 174 are of similar construction and operation as the sealing elements illustrated in the FIGS. 1-6. To accomplish the desired two-way sealing capability, the valve stem 180 is formed to define a passage 182 terminating at one extremity in the seal pocket 174 and at the opposite extremity at the lower portion of the valve stem. The butterfly disc 184 may be formed to define a generally horizontally oriented bore 186 that is intersected by a passage 188. A pair of valve seat elements 190 and 192 may be threadedly retained at the outer extremities of the bore 186 and may entrap a ball valve element 194 between the valve seats. The pressurized fluid medium from the upstream of the valve disc will enter the bore 186 and passage 188 through the aperture in the upstream valve seat 190 or 192, depending upon the particular position of the butterfly disc 184. The ball element 194 will simply be forced downstream by the pressurized fluid medium and will establish downstream sealing with the respective one of the seat elements 190 or 192. As shown in the drawings, pressure is acting toward the right as shown by the flow arrow. The pressurized fluid medium traverses passage 182 and enters the annular seal chamber 174 where it acts upon inner and outer sealing elements 176 and 178 to cause pressure enhanced sealing to occur.

In view of the fact that the seal chamber or pocket is fairly large and the passages communicating fluid pressure into the seal chamber are of small dimension under certain conditions the inner sealing element might be subjected to excessive extrusion through the seal groove 38 or portions of the inner seal may be forced or blown into the valve bore by pressure within the seal chamber upon sudden opening of the valve. Sudden release of upstream pressure upon opening the valve may create a pressure differential that acts severely from within the seal chamber and the volume of the seal chamber may in some cases prevent adequate venting of pressure from the seal chamber. To overcome this problem the seal chamber between the inner and outer sealing elements may be filled with an incompressible fluid medium such as silicon gel, for example, that allows the seal chamber to be properly pressurized without transfer of a large volume of compressible medium into and out of the seal chamber. Obviously this problem is not encountered if the valve is handling a liquid material which is not compressible.

At times, it may be desirable to place the valve mechanism between pairs of pipe flanges and to secure the valve body structure between the flanges. For accomplishment of this purpose, each of the valve body plates is provided with a plurality of bolt apertures such as shown at 200 and 202, which apertures are disposed in registry, one with the other, and also may be placed in registry with bolt apertures 204 formed in the flange portion of the pipe section. To secure the valve mechanism in assembly with the flanges of the pipe section, bolts 26 may be inserted through the registering apertures of the pipe flanges and valve body and may be secured in tight intimate engagement therewith by means of nuts 27 that may be threaded onto the bolts. This manner of assembly is illustrated in FIG. 1.

It may be desirable to assemble the butterfly valve mechanism to a single pipe flange, thereby providing a valve closure at the extremity of a pipe section. In accordance with the present invention, this may be conveniently accomplished by forming the apertures 202 of the downstream valve body section with internal threads, as shown in FIG. 1, thereby providing that a threaded bolt extending through registering apertures in the pipe flange and the upstream valve body plate may have threaded engagement with the threaded apertures 202 of the downstream valve body plate. This causes the valve body plates to be secured in intimate, positively secured abutment with a single flange. The valve mechanism in this case will function in the same manner as discussed above, with the inner and outer annular seal elements being pressure actuated to enhance the sealing engagement thereof with the valve disc, to enhance mechanical sealing thereof with the valve plates of the valve body and to provide for pressure enhanced sealing with the operating stem and trunnion of the valve mechanism.

A valve mechanism constructed in accordance with the present invention is quite easily assembled and disassembled, causing initial assembly costs to be quite low and also allowing the valve mechanism to be quite simply and inexpensively repaired in the field. For purposes of assembly, the annular sealing elements 92 and 94 are brought into assembly with respective ones of the valve body plates 14 or 16. The valve disc 50 may then be located within the flow passage of the valve, and the stem and trunnion elements may be inserted through the stem apertures in the sealing elements and into the respective stem and trunnion receptacles formed in the valve disc. After this has been accomplished, the remaining upstream or downstream valve body plate may be brought into abutting assembly with the remaining valve plate. The valve mechanism is considered complete at this point, but it is functional only when the upstream and downstream valve body plates are retained in assembly. This is accomplished, as discussed above, by connecting the valve mechanism between the flanges of pipe sections or by connecting the valve body structure to a single pipe flange. For replacement of the annular seal element or for accomplishment of other repair, the bolts may be removed and the valve body structure will simply slide from between the pipe flanges. This feature effectively eliminates any necessity for accomplishing mechanical spreading or alteration of the pipe sections and pipe flanges to allow removal of the valve mechanism. After the valve assembly has been repaired or replaced, it is simply placed between the pipe flanges or placed in abutment with a single flange and bolted connection is readily established.

Referring now to FIG. 10, there is shown a butterfly valve mechanism generally at 210 which is constructed in accordance with the present invention and which is especially suited to conditions of extremely high pressure. Butterfly valves having elastomer sealing elements are typically difficult to operate when pressure conditions are high, especially under conditions where the sealing elements thereof are energized by pressure to enhance the sealing ability of the valve. In accordance with the construction set forth in FIG. 10, the valve mechanism 210 may incorporate upstream and downstream body plate elements 212 and 214, respectively having annular seal grooves 216 and 218 formed therein that cooperate to define an annular seal chamber 220. Inner and outer annular sealing elements 222 and 224 are located within the seal chamber 220 with a sealing portion 226 of the inner sealing element extending through an annular groove 228 defined by the interfitting body plates 212 and 214. The seal groove and the sealing elements may be constructed essentially identical with the sealing elements of FIGS. 1–6 and may have generally identical sealing function as compared to the FIGS. 1–6. The upstream body plate 212 may be formed to define a pressure introduction passage 230 communicating fluid pressure from the upstream line into the seal chamber 220. With the valve disc closed and in sealing engagement with the sealing portion 226 of the inner sealing element 222, pressure introduced through the passage 230 into the chamber 220 will enhance the sealing ability of the valve in the manner discussed above. If it is desirable to relieve the pressure within the seal chamber 220 to facilitate ease of valve opening movement under high pressure conditions, this may be conveniently accomplished by controlled venting of the sealed chamber into the downstream line. As shown in FIG. 10, one suitable means for accomplishing this feature may conveniently take the form of a vent passage 232 formed in the downstream body plate 214, which passage is in communication with the seal chamber 220. At the outer internally threaded extremity 234 of the passage 232 may be received a vent for bypass valve assembly 236 capable of controlling flow of fluid through passage 232. A bypass conduit 238 may be provided for communication of the downstream side of valve 236 with the flow passage of the valve. As shown in FIG. 10, a fitting 240 may be threadedly received at the downstream portion of the valve construction to establish communications between conduit 238 and the downstream side of the flow line.

Prior to opening a closed butterfly valve, the vent valve 236 will be opened thereby relieving pressure within the chamber 220 and substantially and immediately reducing the degree of seal pressure actuation acting between the sealing element and valve disc. Substantially less force will be required to open the valve under this condition and any tendency for the internal sealing element to be extruded or damaged during opening will be substantially lessened.

Although FIGS. 1–6 of the drawings illustrate a valve construction wherein bolts pass through apertures in the valve body placed to retain the valve in assembly with pipe flanges, it is not intended to limit the present invention to this particular construction. In the event it should be desirable to utilize the sealing concept of the present invention in conjunction with a sandwich type butterfly valve the valve body plates 212 and 214 may be disposed between pipe flanges such as shown at the left portion of FIG. 10 at 242 and bolts 244 may be received through apertures 246 in the flanges and may be positioned so as to surround the valve body plate. In this case, it will not be necessary to machine bolt apertures in the valve body plate and manufacturing cost of the valve construction will be quite low.

It may also be desirable to provide a butterfly valve construction incorporating the pressure energized sealing features set forth hereinabove but which may be directly connected to a flow line by conventional threaded or welded connection. This may be accomplished as shown at the right hand portion of FIG. 10 by providing the body plates with connection extensions such as shown at 248. The connection extension shown at FIG. 10 is designed for welded connection of the valve into a flow line. Obviously, the connection extension 248 may be formed to define threads for threaded connection or flanges for flange connection of the valve construction in conventional manner. In this case, the valve body plates 212 and 214 would be machined to define bolt apertures and a plurality of bolts would be employed to retain the valve body plates in assembly.

An important feature of the valve constructions is that the butterfly disc shown in the various Figures of the drawings is capable of 360° rotation within the flow passage defined by the valve body. The two-way sealing capability of the valve construction set forth in FIG. 8 is determined by the full rotational capability of the butterfly disc, allowing port 168 to face upstream regardless of the direction of fluid flow. This feature, coupled with the ability of the sealing element to shift inwardly responsive to pressure allows the valve to be easily opened and closed with minimal friction forces being involved. This feature effectively reduces the wear that would otherwise occur during opening and closing movement.

In view of the foregoing, it is quite clear that the present invention provides a novel, high-pressure butterfly valve construction that includes pressure actuatable seal elements, the sealing ability of which is enhanced by line pressure. Line pressure also serves to enhance a valve body joint seal established by the outer peripheral portion of the outer seal element and to establish stam and trunnion seals to prevent leakage along the stem and trunnion elements of the valve mechanism. The valve body construction is designed for efficient and simple connection thereof between pipe flanges or for ready connection to a single pipe flange, as desired. The novel construction of the valve mechanism of the present invention also effectively promotes the development of the two-way sealing capability. The present invention is therefore well adapted to attain all of the features and advantages hereinabove set forth, together with other advantages which will become obvious and inherent from a description of the apparatus itself. It will be understood that certain combinations and sub-combinations are of utility and may be employed without reference to other features and sub-combinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A high pressure butterfly valve having pressure enhanced sealing, said butterfly valve comprising:
   a pair of valve body sections being joined to define a valve body, said valve body being connectable to a flow line and being formed to define a flow passage;
   said valve body sections cooperating to define an annular seal chamber having an annular seal aperture of smaller dimension than the dimension of said seal chamber;
   valve stem means being rotatably supported by said valve body and having a valve operating portion thereof extending externally of said valve body, said valve stem means having a butterfly disc engaging portion disposed within said flow passage;
   a butterfly disc element being positioned within said flow passage and being supported for rotation between open and closed positions by said valve stem means, said butterfly element having an outer periphery that is positioned in juxtaposed relation with said annular seal aperture in the closed position of said butterfly element;
   an inner annular seal being located within said seal chamber at the radially inner portion thereof and having an outer annular pressure responsive body sealing portion and an inner annular disc sealing portion, said disc engaging portion extending through said annular seal aperture into said flow passage and having sealing engagement with the periphery of said butterfly disc element in the closed position of said butterfly disc element;
   an outer annular seal being located within said seal chamber at the radially outer portion thereof and being positioned in radially spaced relation with said inner annular seal, said outer annular seal establishing sealing contact with each of said valve body sections and bridging the joint between said body sections, said outer annular seal being urged into sealing engagement with said body sections responsive to pressure within said seal chamber;
   passage means being defined by said butterfly valve and communicating fluid pressure from said flow passage to said seal chamber;
   said inner sealing portion of said inner annular seal being urged toward said periphery of said valve disc responsive to pressure acting with said annular seal chamber;
   stem seal means being formed integrally with said inner and outer seals and being in sealing engagement with said valve stem means, the sealing ability of said stem seal means also being enhanced by fluid pressure within said annular seal chamber.

2. A high pressure butterfly valve as recited in claim 1, wherein:
   said passage means is formed in the upstream one of said valve body sections.

3. A high pressure butterfly valve as recited in claim 1, wherein:
   each of said valve body sections is of annular configuration and fits in side-by-side relation to define said valve body with a joint therebetween; and
   means is provided for retaining said body plates in assembly and maintaining alignment of said valve body sections.

4. A high pressure butterfly valve as recited in claim 1, wherein:
   thrust shoulder means is defined by said valve stem means; and
   stem retainer means is defined on said valve body and transmits any force induced to said stem means by pressure within said annular seal chamber to said thrust shoulder means, said stem retainer means interlocking said body sections and maintaining alignment of said valve body sections.

5. A high pressure butterfly valve as recited in claim 1, wherein said valve body comprises:
   upstream and downstream valve body sections being intimately joined, the joint therebetween being disposed in substantially normal relation to the direction of flow through said valve;
   said upstream and downstream valve body sections cooperating to define stem retainer means and said seal chamber, said stem means being received by said stem retainer means; and
   said outer annular sealing element establishing a seal with said upstream and downstream valve body sections and preventing leakage at said joint.

6. A high pressure butterfly valve as recited in claim 1, wherein:
   said valve body sections are of annular plate-like configuration and are received in abutting relation between pipe flanges.

7. A high pressure butterfly valve as recited in claim 6, wherein:
   said valve body sections are formed to define connection apertures, said connection apertures being disposed in registry and being adapted for registry with bolt apertures of pipe flanges and receiving bolt means that retain said valve body in intimate assembly between pipe flanges.

8. A high pressure butterfly valve as recited in claim 7, wherein:
   said connection apertures of said downstream valve body section are internally threaded and are adapted to receive the threads of bolts to retain said valve body in assembly with a single pipe flange.

9. A high pressure butterfly valve as recited in claim 1, wherein:

said valve body sections are formed to define annular groove means, said groove means cooperating upon assembly of said valve body sections to define said annular seal chamber and to define said annular seal aperture; and said inner and outer annular seals each being in sealing engagement with each of said body sections.

10. A high pressure butterfly valve as recited in claim 1, wherein:

said inner and outer annular sealing elements have initial interference sealing engagement with axially opposed surfaces within said seal chamber.

11. A high pressure butterfly valve as recited in claim 1, wherein said valve mechanism includes:

chamber venting means for venting pressure from said seal chamber; and valve means for controlling venting of said seal chamber.

12. A high pressure butterfly valve as recited in claim 1, wherein:

said inner sealing portion of said inner annular seal is capable of limited radial movement responsive to pressure within said seal chamber.

13. A high pressure butterfly valve as recited in claim 1, wherein said valve is provided for controlling the flow of a compressible medium and wherein said valve mechanism includes:

a substantially incompressible medium substantially filling the space within said annular seal chamber between said inner and outer annular seals.

14. A high pressure butterfly valve as recited in claim 1, wherein:

said butterfly disc element is capable of 360° rotation within said flow passage.

15. A high pressure butterfly valve as recited in claim 1, wherein:

said outer periphery of said butterfly disc defines a partially spherical sealing surface.

16. A high pressure butterfly valve as recited in claim 1, wherein said valve mechanism includes:

chamber venting means for venting pressure from said seal chamber while said passage means is in communication with said seal chamber; and valve means for controlling venting of said seal chamber into said flow passage.

17. A butterfly valve construction adapted to be received in abutting relation between the flanges of pipe sections, said valve construction comprising:

upstream and downstream valve body plates of generally flat configuration being disposed in abutment and defining a valve body having a body joint and having a flow passage;

each of said plates being formed to define an annular seal receptacle and at least one valve support stem receptacle intersecting said seal receptacle, said seal receptacle defining an annular base portion and an annular seal opening, said base portion of said seal receptacle being of larger dimension than the dimension of said annular seal opening;

one of said valve body plates being formed to define passage means communicating said seal receptacle with said flow passage;

stem means being received within said stem receptacle;

valve disc means being supported within said flow passage by said stem means and being rotatable between open and closed positions to control the flow of fluid through said valve, said valve disc means having a sealing periphery;

an inner annular deformable seal being positioned within said seal receptacle at the radially inner portion thereof, said inner seal element having a disc sealing portion located within said annular seal opening and adapted for sealing engagement with said sealing periphery of said valve disc means and defining a body sealing portion having sealing engagement with both of said valve body plates;

an outer annular deformable seal being located within said seal receptacle at the radially outer portion thereof and being positioned in radially spaced relation with said inner annular seal, said outer annular seal establishing sealing contact with each of said body plates and bridging the joint between said body plates, said inner and outer annular seals being urged into sealing engagement with said body plates by pressure within said seal receptacle; and means communicating fluid pressure from said flow passage to said seal receptacle.

18. A butterfly valve construction as recited in claim 17, wherein:

said inner and outer seal elements are formed to define stem seal means, said stem seal means having sealing engagement with said stem means, said stem seal means being exposed to pressure communicated through said passage means and being enhanced by said pressure.

19. A butterfly valve construction as recited in claim 17 wherein:

said valve body plates are formed to define a trunnion receptacle being positioned in opposed relation with said stem receptacle; and a trunnion element is located within said trunnion receptacle and cooperates with said stem element to rotatably support said valve disc means within said flow passage.

20. A butterfly valve construction as recited in claim 19, wherein:

said inner and outer seal elements are formed to define trunnion seal means having sealing engagement with said trunnion means, said trunnion seal means being exposed to pressure communicated through said passage means, sealing of said trunnion seal being enhanced by said pressure within said seal receptacle.

21. A butterfly valve construction as recited in claim 17, wherein:

bolt openings of said downstream valve body plate are internally threaded and are adapted to receive the threads of bolts to retain said valve body in assembly with a single pipe flange.

22. A butterfly valve construction as recited in claim 17, wherein said valve is provided for controlling the flow of a compressible medium and wherein said valve construction includes:

a substantially incompressible medium substantially filling the space within said seal receptacle between said inner and outer seal elements.

23. A butterfly valve construction as recited in claim 17, wherein:

said butterfly disc element is capable of 360° rotation within said flow passage.

24. A butterfly valve mechanism as recited in claim 17, wherein:

said sealing periphery of said valve disc being of partially spherical configuration.

25. A high pressure butterfly valve mechanism having pressure enhanced sealing, said butterfly valve mechanism comprising:
 a pair of body sections being disposed in abutting relation and defining a joint therebetween said body sections cooperating to define an annular seal chamber, a flow passage and an annular seal groove communicating said flow passage with said seal chamber;
 an inner annular seal being disposed within said seal chamber and having an annular disc contacting portion extending through said annular seal groove, said inner annular seal having an outer pressure responsive sealing portion having an initial interference seal with each of said body sections;
 an outer annular seal being positioned within said annular seal chamber at the radially outer portion thereof and being in spaced relation with said inner annular seal, said outer annular seal bridging the joint between said body sections;
 said inner and outer sealing elements defining a pressure chamber therebetween;
 a butterfly valve disc being positioned within said flow passage and being movable between open and closed positions to control the flow of fluid flow through said flow passage;
 valve stem means being rotatably received by said valve body sections and supporting said valve disc for rotation within said flow passage;
 means defining a passage communicating fluid pressure from said flow passage into said seal chamber; and
 said inner and outer annular seals having initial interference sealing with said body sections and being energized by pressure within said seal chamber to cause pressure responsive enhancement of the sealing engagement between said disc contacting portion and said disc.

26. A high pressure butterfly valve mechanism as recited in claim 25, wherein:
 said inner annular seal is defined by an elongated annular body portion with said disc contacting portion extending from the intermediate portion thereof; and
 a pair of annular lips being located at the axial extremities of said annular body portion, said lips being deformed upon assembly of said seal means within said seal chamber to define said interference seal.

27. A high pressure butterfly valve mechanism as recited in claim 25, wherein said valve mechanism includes:
 vent means for relieving pressure from said seal chamber; and
 valve means for controlling relief of pressure from said seal chamber.

28. A high pressure butterfly valve mechanism as recited in claim 25, wherein said valve is provided for controlling the flow of a compressible medium and wherein said valve mechanism includes:
 a substantially incompressible medium substantially filling the space within said seal chamber between said inner and outer seals.

29. A high pressure butterfly valve mechanism as recited in claim 25, wherein:
 said butterfly valve disc being capable of 360° rotation within said flow passage.

30. A high pressure butterfly valve mechanism as recited in claim 25, wherein:
 said butterfly valve disc having a sealing periphery of partially spherical configuration.

31. A high pressure butterfly valve as recited in claim 25, wherein said valve mechanism includes:
 chamber venting means for venting pressure from said seal chamber while said passage means is in communication with said seal chamber; and
 valve means for controlling venting of said seal chamber into said flow passage.

32. A high pressure butterfly valve having pressure enhanced sealing, said butterfly valve comprising:
 a pair of valve body sections, being joined to define a valve body, said valve body being formed to define a flow passage;
 said valve body sections cooperating to define an annular seal chamber having an annular seal aperture;
 valve stem means being rotatably supported by said valve body;
 a butterfly disc element being positioned within said flow passage and being supported for rotation between open and closed positions by said valve stem means;
 annular sealing means being located within said seal chamber and defining an outer annular pressure responsive body sealing portion and an inner annular sealing portion, said inner sealing portion having a disc engaging portion extending through said annular seal aperture and having sealing engagement with the periphery of said butterfly disc element in the closed position of said butterfly disc element;
 said inner and outer sealing portions each being formed to define a pair of spaced annular sealing lips, said sealing lips being deformed upon assembly of said valve to define initial interference sealing with said upstream and downstream valve body sections;
 passage means communicating fluid pressure from said flow passage to said seal chamber;
 said annular seal means being energized by pressure within said seal chamber to cause pressure responsive enhancement of the sealing engagement between said disc engaging portion and said disc.

33. A high pressure butterfly valve having pressure enhanced sealing, said butterfly valve comprising:
 a pair of valve body sections, being joined to define a valve body, said valve body being formed to define a flow passage;
 said valve body sections cooperating to define an annular seal chamber having an annular seal aperture;
 valve stem means being rotatably supported by said valve body;
 a butterfly disc element being positioned within said flow passage and being supported for rotation between open and closed positions by said valve stem means;
 annular sealing means being located within said seal chamber and defining an outer annular pressure -responsive body sealing portion and an inner annular sealing portion, said inner sealing portion having a disc engaging portion extending through said annular seal aperture and having sealing engagement with the periphery of said butterfly disc element in the closed position of said butterfly disc element;

said inner sealing portion is capable of limited radial movement responsive to pressure within said seal chamber and is relieved on either side of said disc engaging portion and allowing said radial movement to occur within limits of said relief;

passage means communicating fluid pressure from said flow passage to said seal chamber;

said annular seal means being energized by pressure within said seal chamber to cause pressure responsive enhancement of the sealing engagement between said disc engaging portion and said disc.

34. A high pressure butterfly valve mechanism having pressure enhanced sealing, said butterfly valve mechanism comprising:

a pair of body sections being disposed in abutting relation and defining a joint therebetween, said body sections cooperating to define an annular seal chamber, a flow passage and an annular seal groove communicating said flow passage with said seal chamber;

means sealing said joint between said body sections;

annular seal means being disposed within said seal chamber and having an annular disc contacting portion extending through said annular seal groove;

a butterfly valve disc being positioned within said flow passage and being movable between open and closed positions to control the flow of fluid flow through said flow passage;

valve stem means being rotatably received by said valve body sections and supporting said valve disc for rotation within said flow passage;

means communicating fluid pressure from said flow passage into said seal chamber having passage means extending through said valve disc and valve stem and communicating fluid pressure from one side of said valve disc into said seal chamber;

said annular seal means having initial interference sealing with said body sections and being energized by pressure within said seal chamber to cause pressure responsive enhancement of the sealing engagement between said disc contacting portion and said disc.

35. A high pressure butterfly valve mechanism as recited in claim 34, wherein:

said valve disc is formed to define a transverse passage, said transverse passage means having spaced valve seat means located therein; said transverse passage being communicated intermediate said valve seat means with said passage means communicating fluid pressure into said seal chamber;

check valve means being located within said transverse passage between said spaced valve seat means and effecting a pressure responsive seal with the downstream one of said valve seat means and causing sealing of said valve to be pressure enhanced regardless of the direction of fluid flow within said valve.

* * * * *